3,009,267
ANATOMICAL DEVICE
Richard S. Bezark, Glencoe, Ill., assignor, by mesne assignments, to Superior Plastics Inc., Chicago, Ill., a corporation of Illinois
Filed Dec. 30, 1959, Ser. No. 862,874
3 Claims. (Cl. 35—17)

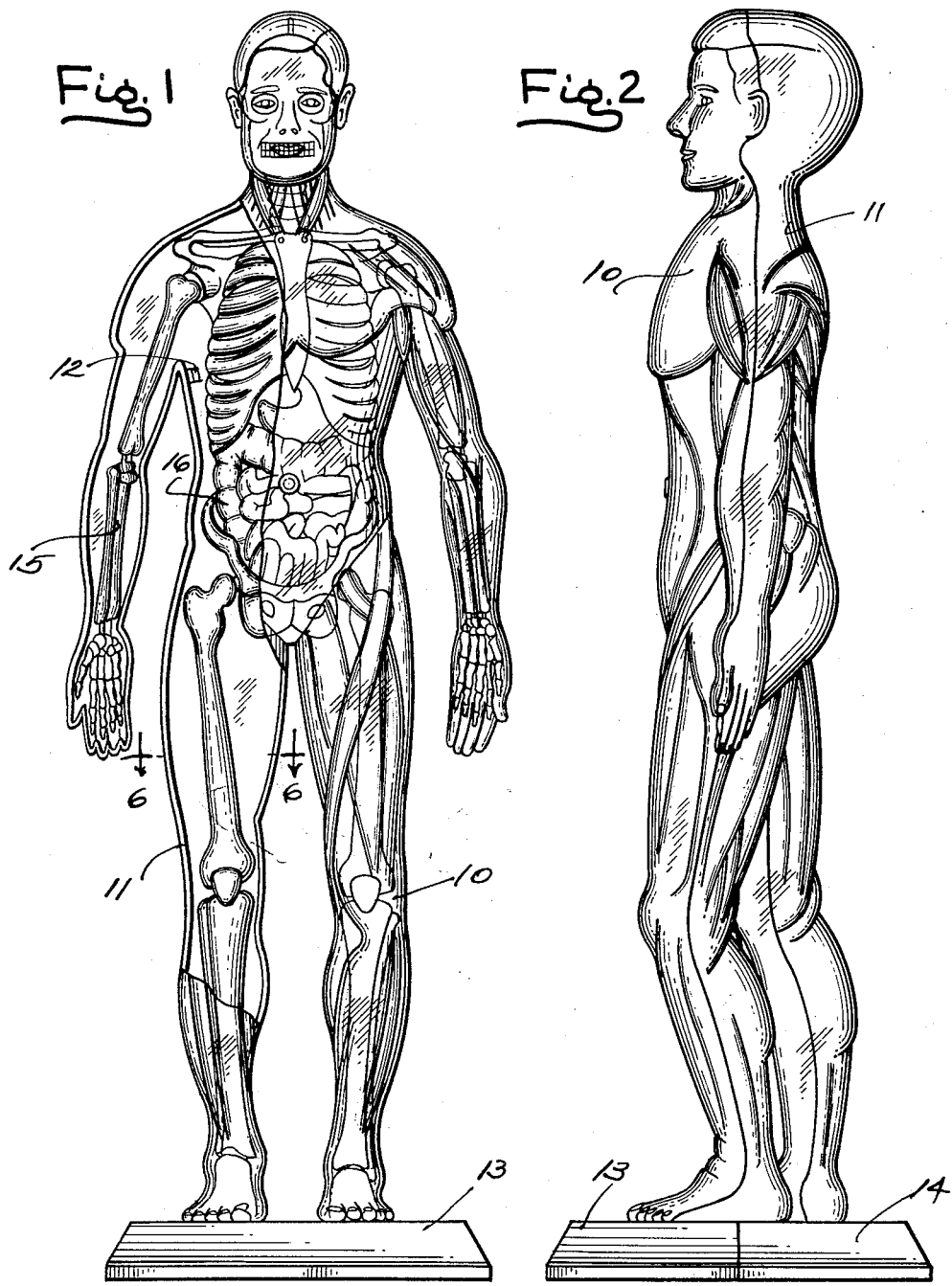

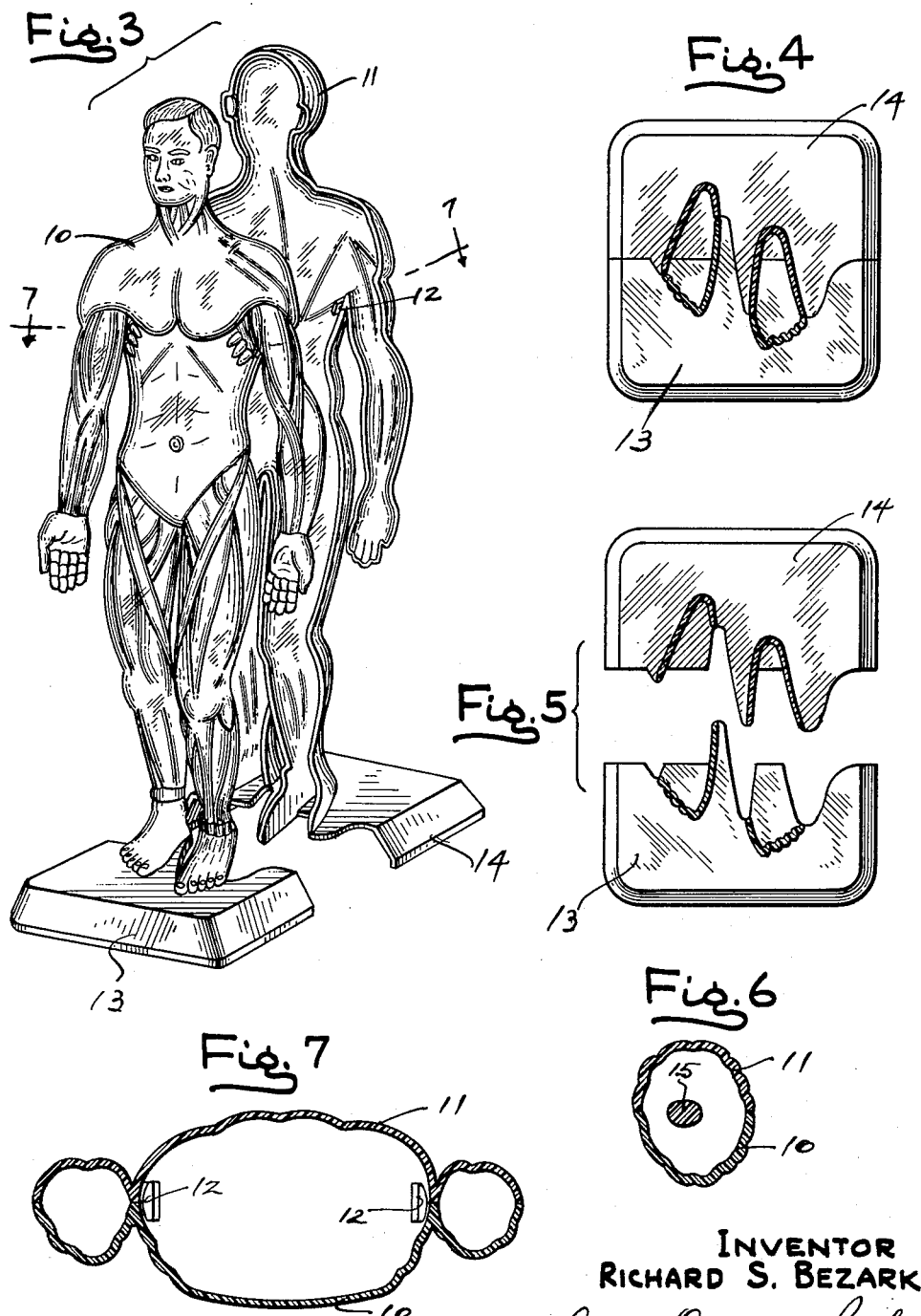

This invention relates to a novel anatomical educational device, and particularly to a simulated human body composed of synthetic plastic material.

It is a particular object of the present invention to provide a simulated human body in the form of a transparent skin or shell supported uprightly on an integral base, the whole being split and adapted to receive therein a simulated human skeleton, with or without simulated human integral organs, such as shown and described in my copending application Serial No. 819,412, filed June 10, 1959.

The objects and advantages of the present invention, the arrangement of parts and economies thereof will be apparent from a consideration of the following specification and accompanying drawings, wherein:

FIG. 1 is a front elevational view, with parts broken away, showing a transparent, simulated human body shell supported upright on a base, in accordance with the present invention, and having visibly disposed therein and supported thereby a simulated human skeleton and internal organs.

FIG. 2 is a side elevational view of the article of the present invention as shown in FIG. 1, but without contents.

FIG. 3 is a perspective, exploded, elevational view of the components of FIG. 2.

FIG. 4 is a bottom plan view of the assembly of FIG. 2, and FIG. 5 is a similar exploded view.

FIG. 6 is a section on the line 6—6 of FIG. 1.

FIG. 7 is a section on the line 7—7 of FIG. 3, but with the halves brought together as in FIG. 2.

Referring to the drawings, the reference numerals 10 and 11 designate the front and rear sections, respectively, of a hollow shell composed of transparent synthetic plastic, such as for example acrylic resin, simulating a human body. As is apparent from the drawings, the outer surfaces of components 10 and 11 are molded to show muscles, arteries, veins and nerves in substantially material bas relief, making them easy to follow or to color, if desired.

The hollow shell is split in a substantially vertical direction but on a somewhat sinuous line bisecting the body components on natural contours. As an aid in maintaining alignment, means such as the lugs 12 on component 11 projectable into component 10 can be employed.

Integral with the body shell components 10 and 11 I provide supporting base and foot closure portions 13 and 14, respectively, split from each other in a transverse irregular direction so that they fit together in an interdigitated manner as best shown in FIGS. 4 and 5, to form a platform supporting the shell components in upright position, separately or jointly. The division of the base on a sinuous line also aids in maintaining alignment of the shell halves when brought together, in combination with lugs 12.

As shown in the combination of FIG. 1, the transparent body shell is adapted to receive and visibly support a simulated human skeleton, generally indicated as 15, composed of a plurality of joined articulated simulated skeletal components formed of opaque plastic material such as described in my aforesaid copending application. As there also shown, the skeletal components can embrace a plurality of internested simulated human internal organ components 16. The latter are also suitably formed of plastic resinous material and desirably in contrasting colors or color shades.

It will thus be seen that I have provided a realistic three dimensional model of a human body, the component parts of which may be employed jointly or severally, and that the present characterizing skin or body shell may be used as a "window" model to show organs and skeleton in position inside.

If desired, the two halves may be temporarily secured together by various inconspicuous means, such as by a short length or lengths of transparent pressure-sensitive adhesive tape placed across the line of division at the underside of the base parts 13 and 14, or by a small rubber band around the wrists, or neck.

Although I have shown and described the preferred embodiment of my invention, modifications will become apparent to those skilled in the art within the scope of the appended claims.

I claim:

1. An anatomical device comprising a transparent, hollow, shell-like simulated human body and an integral platform supporting and providing a bottom closure for said body, said body and platform being in the form of two separable complementary halves the former divided on an irregular generally vertically extending line and the latter on an irregular generally transversely extending line as alignment aids, and means carried by said halves for further aiding in maintaining them in alignment with each other comprising lugs on one body component projectable within the confines of and into abutment with the other body component.

2. An anatomical device comprising a transparent, hollow, shell-like simulated human body and an integral platform supporting and providing a bottom closure for said body, said body and platform being in the form of two separable complementary halves divided on an irregular generally vertically extending line, and means carried by said halves for maintaining them in alignment with each other comprising a sinuous transverse line of division on said platform defining interdigitated defining edge portions thereof.

3. An anatomical device comprising a transparent, hollow, shell-like simulated human body comprising integral torso, head, arms and legs and an integral platform supporting and providing a bottom closure for said body, said body and platform being in the form of two separable complementary halves, the former divided on an irregular generally vertically extending line and the latter on an irregular generally transversely extending line, means on said halves for aiding and maintaining them in alignment with each other, and an articulated simulated human skeleton nested and visibly disposed within said body and supported by said aligned shell halves and said platform, the outer surfaces of said shell-like body portions being molded to show muscular structure correlated in juxtaposition to said contained skeleton.

References Cited in the file of this patent
UNITED STATES PATENTS

| | | |
|---|---|---|
| 411,816 | Lee | Oct. 1, 1889 |
| 2,417,195 | Hargreaves | Mar. 11, 1947 |
| 2,763,070 | McCormick | Sept. 18, 1956 |
| 2,971,272 | Barlow | Feb. 14, 1961 |

FOREIGN PATENTS

| | | |
|---|---|---|
| 425,261 | France | Mar. 31, 1911 |
| 756,342 | Great Britain | Sept. 5, 1956 |

OTHER REFERENCES

British Plastics (Periodical), December 1949, pages 634–639.

"Juno," Cleveland Health Museum (Pamphlet), 1952 (20 pages).

UNITED STATES PATENT OFFICE
CERTIFICATION OF CORRECTION

Patent No. 3,009,267            November 21, 1961

Richard S. Bezark

It is hereby certified that error appears in the above numbered patent requiring correction and that the said Letters Patent should read as corrected below.

In the grant, lines 2 and 3, for "assignor, by mesne assignments, to Superior Plastics Inc., of Chicago, Illinois, a corporation of Illinois," read -- assignor, by mesne assignments, to Superior Plastics, Inc., of Chicago, Illinois, a corporation of Delaware, --; line 12, for "Superior Plastics Inc., its successors" read -- Superior Plastics, Inc., its successors --; in the heading to the printed specification, lines 3 to 5, for "assignor, by mesne assignments, to Superior Plastics Inc., Chicago, Ill., a corporation of Illinois" read -- assignor, by mesne assignments, to Superior Plastics, Inc., Chicago, Ill., a corporation of Delaware --.

Signed and sealed this 17th day of April 1962.

(SEAL)
Attest:

ESTON G. JOHNSON            DAVID L. LADD
Attesting Officer           Commissioner of Patents